US00RE39732E

(19) United States
(12) Reissued Patent
Lesimple

(10) Patent Number: US RE39,732 E
(45) Date of Reissued Patent: Jul. 17, 2007

(54) DRIVING HEAD FOR STIRRER CANS

(75) Inventor: Michel Lesimple, Coulombs (FR)

(73) Assignee: Fillon Investissement, Faverolles (FR)

(21) Appl. No.: 09/648,588

(22) Filed: Aug. 25, 2000

Related U.S. Patent Documents

Reissue of:
(64) Patent No.: 5,800,057
Issued: Sep. 1, 1998
Appl. No.: 08/748,891
Filed: Oct. 8, 1996

(30) Foreign Application Priority Data

Dec. 8, 1995 (FR) ..... 95 14574

(51) Int. Cl.
*B01F 7/20* (2006.01)
*B01F 7/24* (2006.01)

(52) U.S. Cl. ..... 366/198; 366/249; 366/605
(58) Field of Classification Search ..... 366/197, 366/198, 242–251, 605
See application file for complete search history.

(56) References Cited

U.S. PATENT DOCUMENTS

| | | | | |
|---|---|---|---|---|
| 2,428,492 | A | * 10/1947 | Haller | |
| 2,524,384 | A | 9/1950 | Marienthal | 366/249 |
| 2,603,461 | A | 7/1952 | Marienthal | |
| 2,695,363 | A | 11/1954 | Marvin | |
| 2,757,910 | A | 8/1956 | O'Neill | |
| 2,802,649 | A | 8/1957 | Stockton | |
| 2,965,363 | A | 12/1960 | Worden | |
| 3,041,052 | A | 6/1962 | Dedoes | 366/247 |
| 3,118,653 | A | 1/1964 | Dedoes | |
| 3,175,808 | A | 3/1965 | Dedoes | |
| 4,299,500 | A | * 11/1981 | Bassetti | |
| 4,380,399 | A | 4/1983 | Godat et al. | 366/605 X |
| 4,407,584 | A | 10/1983 | Boudin et al. | |
| 4,662,760 | A | 5/1987 | Powell | |
| D292,803 | S | 11/1987 | Powell | |
| 5,017,017 | A | * 5/1991 | Godat et al. | 366/251 |
| 5,096,071 | A | 3/1992 | Neri | 366/605 X |

(Continued)

FOREIGN PATENT DOCUMENTS

| | | | | |
|---|---|---|---|---|
| EP | 0065498 | | 11/1982 | |
| EP | 0125213 | A2 * | 11/1984 | |
| EP | 127589 | | 12/1984 | 366/605 |
| EP | 0143145 | | 9/1987 | |
| EP | 0298806 | A1 * | 1/1989 | |
| EP | 0409715 | | 1/1991 | |
| EP | 0630764 | | 12/1994 | |
| EP | 0633055 | | 1/1995 | |
| FR | 82 02665 | | 2/1982 | |
| FR | 2521493 | | 8/1983 | |
| FR | 2785953 | A1 * | 5/2000 | |
| FR | 2785953 | * | 5/2000 | |
| FR | 2874512 | A1 * | 3/2006 | |
| IT | 01250630 | | 4/1995 | |
| WO | 03/045707 | A1 * | 6/2004 | |

OTHER PUBLICATIONS

German litigation.

*Primary Examiner*—Charles E. Cooley
(74) *Attorney, Agent, or Firm*—Fish & Richardson P.C.

(57) ABSTRACT

A driving head for a stirrer can is provided. The stirrer can includes a cover with a rotatable plate having upwardly projecting fingers and further includes a stirrer inside the stirrer can. The driving head is mounted beneath a hollow shelf, includes a driven shaft and a blade fixedly connected to the driven shaft. The blade engages the fingers for driving the stirrer inside the stirrer can. A swan-neck shaped body having an upper portion, connected to the shelf, and a lower portion is provided. The lower portion of the body comprises a grip for engaging the rotatable plate of the stirrer can. The driven shaft projects through the upper portion of the body. A device for preventing rotation of the stirrer can is provided.

30 Claims, 5 Drawing Sheets

U.S. PATENT DOCUMENTS 5,160,198 A 11/1992 Fillon ..... 366/249 X
5,310,258 A * 5/1994 Godat et al. ..... 366/251
5,335,806 A 8/1994 Dedoes
5,358,153 A 10/1994 Caldwell et al.
5,368,389 A 11/1994 Dedoes
5,413,257 A 5/1995 Amberger et al.
5,456,534 A 10/1995 Krzywdziak ..... 366/249
5,472,277 A 12/1995 Dedoes
5,482,370 A * 1/1996 Dedoes ..... 366/247
5,496,109 A 3/1996 Dedoes
5,498,076 A 3/1996 Krzywdziak ..... 366/245
5,498,077 A 3/1996 Krzywdzjak et al. ..... 366/247
6,896,402 B2 * 5/2005 Desinano ..... 366/197
2005/0041524 A1 * 2/2005 Krzywdziak et al. ..... 366/198
2005/0094487 A1 * 5/2005 Mussatto ..... 366/198

* cited by examiner

DRIVING HEAD FOR STIRRER CANS

Matter enclosed in heavy brackets [ ] appears in the original patent but forms no part of this reissue specification; matter printed in italics indicates the additions made by reissue.

FIELD OF THE INVENTION OF THE INVENTION

The invention relates to those cabinets for stirrer cans of the type as used for the storing of cans that contain paints etc. to be maintained under stirring.

BACKGROUND OF THE INVENTION

The cabinets that are currently used comprise a plurality of shelves arranged one above the other, and having a bottom portion that is provided with driving heads of the small blade type, which driving heads cooperate with fingers arranged on the cover of each can and used for driving a shaft passing through this cover and supporting a stirring screw or the like.

In order to prevent rotation of the cans on the shelves, fixed or movable protruding pins are provided, which are used for securely retaining the base of the can. These protruding pins are often harmful and can cause damage to the cans, particularly when the same are made of synthetic material.

The protruding pins or other means for locking the cans have also the important drawback that they make difficult the cleaning of the shelves to which they are fixedly connected. Moreover, in case of leakage of the can, the apertures provided in the shelves for making or positioning the protruding pins allow flow of paint from one shelf to another shelf.

The invention relates to a new driving head for stirrer cans which allow the use of smooth shelves without any particular member to be provided on these shelves.

SUMMARY OF THE INVENTION

According to the invention, the driving head for stirrer cans each comprising a small blade driven by a first shaft and cooperating with fingers for driving a second shaft of a stirrer located in a can, is characterized in that the fingers protrude from a plate engaged in a grip that is a part of a body having a general shape like a swan-neck which is arranged beneath a shelf, this body having an upper portion that is penetrated by the first shaft that carries and drives the small blade as well as means that prevent rotation of each stirrer can.

A driving head for a stirrer can, the stirrer can comprising a cover with a rotatable plate having upwardly projecting fingers and further comprising a stirrer inside the stirrer can, the driving head mounted beneath a hollow shelf, according to the present invention is primarily characterized by:

a driven shaft;

a blade fixedly connected to the driven shaft;

the blade engaging the fingers for driving the stirrer inside the stirrer can;

a swan-neck shaped body having an upper portion connected to the shelf and a lower portion;

the lower portion of the body comprising a grip for engaging the rotatable plate of the stirrer can;

the driven shaft projecting through the upper portion of the body; and means for preventing rotation of the stirrer can.

The driving head may further comprise anti-friction means positioned between the grip and the rotatable plate.

The body preferably comprises a protecting hub of a substantially circular shape positioned closely above the blade.

The driving head may also comprise a drive pulley connected to the driven shaft, the drive pulley positioned within the hollow shelf, wherein the hub comprises a sleeve and a bearing member mounted in the sleeve and wherein the driven shaft is guided in the bearing member.

The driving head may also include a spindle connected to an end of the shaft below the hub, the blade pivotably connected to the spindle, the blade having a bottom portion with a concave cutout to prevent wedging the fingers of the operator.

Preferably, the means for preventing rotation of the stirrer can is a pivotable stirrup connected to the body, the stirrup engaging a portion of the cover of the stirrer can for limiting rotation of the stirrer can after placement on a shelf below the hollow shelf to which the body is connected.

The body preferably comprises a bearing member and the stirrup is connected to the bearing member, the stirrup comprising a yoke with studs for connecting the stirrup to the bearing member.

The grip advantageously has means for supporting the cover and the stirrer can.

The means for supporting are lugs connected to the bottom side of the grip and projecting inwardly.

The cover has preferably a bottom portion and the hollow shelf has a grip support for engaging the bottom portion of the cover.

The present invention also relates to a stirrer can for cooperation with a driving head mounted beneath a shelf. The stirrer can according to the present invention comprises:

a can container;

a cover for closing the can container;

a rotatable plate mounted on the cover;

the rotatable plate having upwardly projecting fingers;

a stirrer connected to the rotatable plate and positioned inside the can container;

the fingers engaged by the driving head when the stirrer can is positioned on a shelf beneath the hollow shelf on which the stirrer head is mounted.

The can may further comprise a spring with a first and a second end, the stirrer comprising a shaft and a stirring screw at an end of the shaft remote from the cover, the spring coaxially placed on the shaft and supported with the first end at a bottom side of the cover and with the second end at the stirring screw.

The invention also relates to a cabinet for stirrer cans. The cabinet according to the present invention is primarily characterized by:

a plurality of hollow shelves spaced one atop the other;

each hollow shelf having a smooth surface;

each hollow shelf having connected thereto a plurality of driving heads;

each one of the driving heads comprised of:

a) a driven shaft and a blade fixedly connected to the driven shaft, the blade engaging a stirrer of a stirrer can for driving the stirrer inside the stirrer can;

b) a swan-neck shaped body having an upper portion connected to the hollow shelf and a lower portion;

c) the lower portion of the body comprising a grip for engaging the rotatable plate of the stirrer can;

d) the driven shaft projecting through the upper portion of the body;

e) a drive pulley connected to the drive shaft and positioned inside the hollow shelf;

f) a drive means for driving at least one of the drive pulleys; and e) means for preventing rotation of the stirrer can.

At least one of the hollow shelves has a bottom portion with two levels, such that the driving heads connected to the bottom portion are at different levels.

The shelves comprise raising members for raising the stirrer cans to a desired level.

Various other features of the invention will moreover be revealed from the following detailed disclosure.

BRIEF DESCRIPTION OF THE DRAWINGS

Embodiments of the invention are shown, as non limitative examples, in the accompanying drawings, wherein.

DESCRIPTION OF THE PREFERRED EMBODIMENTS

Figure 1:
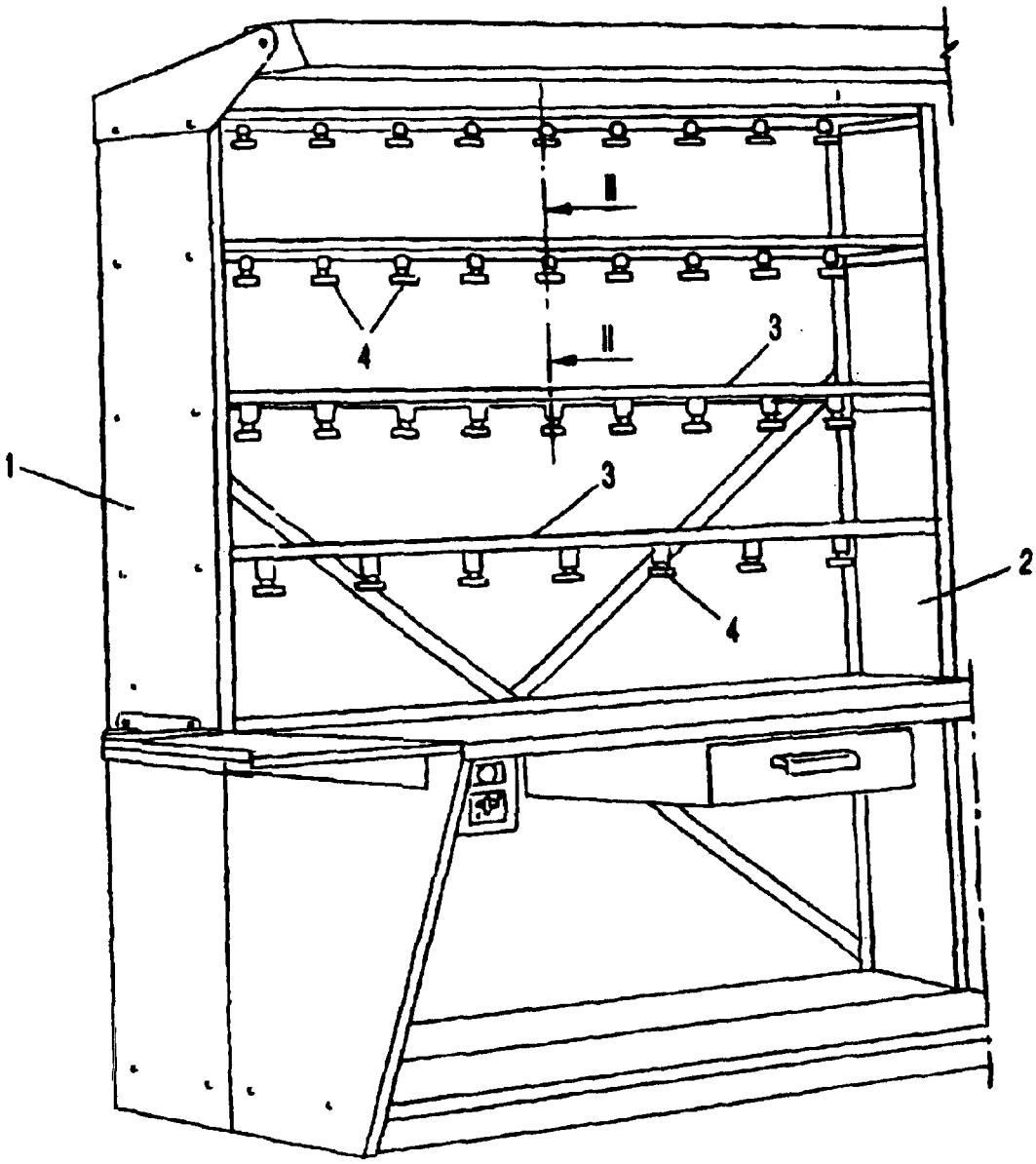
FIG. 1 is a perspective view of a cabinet that comprises driving heads for stirrer cans, according to the invention.
Figure 2:
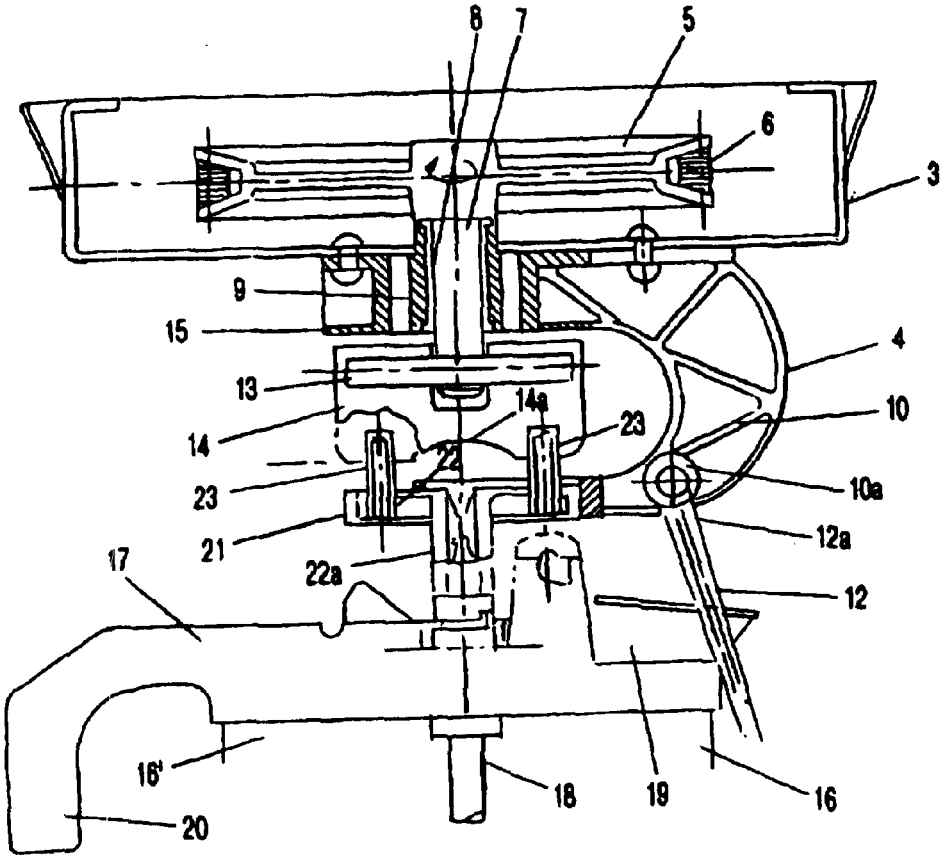
FIG. 2 is a very enlarged partial cross-section taken substantially along line II—II of the FIG. 1, *showing certain portions of the stirring head in elevation*.

Referring now to the drawings, FIG. 1 shows a cabinet that includes upright members 1 and 2 with shelves 3 being arranged between the upright elements 1 and 2 and which are formed by hollow bodies as shown in FIG. 2.

Stirring heads 4 are protruding beneath the shelves 3.

Each of the stirring heads 4 is driven by a pulley 5 arranged within a shelf 3. The various pulleys corresponding to each stirring head are themselves driven, for example, by means of a common belt 6.

The pulleys 5 are mounted on a shaft 7 carried by a bearing member 8 arranged in each of the stirring heads 4 that comprises therefor a sleeve 9.

Figure 3:
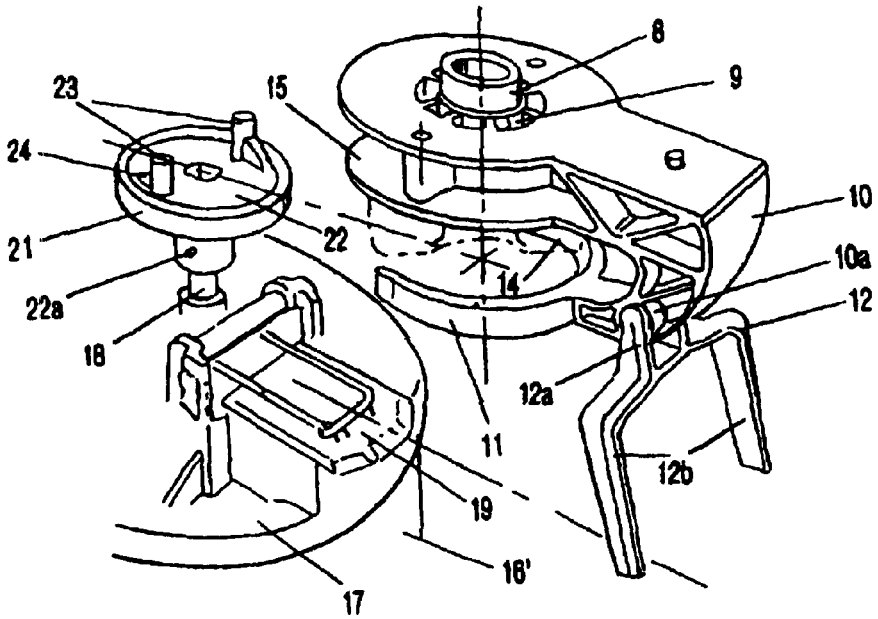
FIG. 3 is an exploded perspective view of the driving head, according to the invention.

As shown in particular in FIGS. 2 and 3, the stirring heads are, preferably, formed by molded parts of plastic material or metal, the body 10 of which has the general shape of a swan-neck ending in a grip 11 having the shape of an outer collar made integrally with the body 10 or attached thereto. The grip 11 is a resilient part and has on an angular opening which is slightly greater than 180°. This grip 11 is advantageously made of an antifriction material or is coated with such an antifriction material.

The body 10 defines a bearing member 10a formed, for example, of a small socket made by molding, used for articulating a stirrup 12 that is advantageously made of molded material and compromises a yoke 12a with arms that have studs or protrusions (not shown) that form an axle articulated in the bearing member 10a.

This embodiment enables to position the stirrup 12 by snapping it into place, the stirrup 12 having to be able to pivot as this is shown in the following description.

In the example as shown, the stirrup 12 comprises two arms 12b. The stirrup 12 could however comprise[d] only one arm (*as would appear to the viewer in the side view of FIG. 2*) or be made by another means preventing a rotation on the cans as this is discussed hereinafter.

The drawings, in particular FIG. 2 show that the shaft 7 has a lower portion carrying a spindle 13 on which is articulated a small blade 14, preferably made of plastic material but which may also be made of metal, which small blade 14 is for example snapped on the spindle 13 in order to be easily mounted and dismounted if it is necessary to change it. In any case, the small blade 14 is mounted for being able to pivot about the spindle 13. Moreover, the small blade 14 is provided with a concavity 14a at its bottom portion so as to present a possible wedging of the fingers of the operator as described hereinafter.

FIGS. 2 and 3 show that the body 10 of the driving head advantageously defines, above the small blade 14, a hub 15 which is approximately circular and has a diameter greater than the width of the small blade 14.

This arrangement makes it impossible for an operator to get a finger caught between a top portion of the small blade 14 and the body 10, in particular the hub 15, which is thus a safety measure preventing any risk of injury. Moreover, the hub 15 is used for fixing the body 10 under the shelf 3 by means of rivets or other equivalent means.

The stirring cans, such as the can 16, are comprised of a can container 16' with a cover 17 that is penetrated by a shaft 18. The cover 17 has a top portion provided with various protruding parts, and in particular a pouring nose 19 as well as a working handle 20.

The shaft 18 has an upper portion provided with a circular plate 22 which is fixed by means of a tightening screw 22a and has a centering ring 21. The centering ring 21 has an annular shape, and the diameter of the centering ring 21 corresponds substantially to the diameter defined by the grip 11. The centering ring 21 can rotate freely or is made of an antifriction material, or still is coated with an antifriction material.

The plate 22 is provided with two protruding fingers 23 and with cans or ramps 24.

Figure 4:
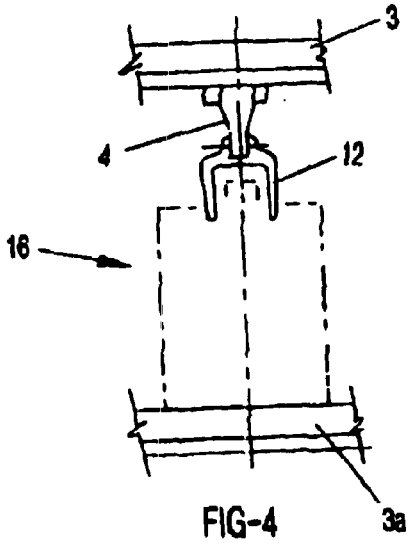
FIGS. 4–7 are elevations, partly in cross-section, diagrammatically showing how to position a stirrer can.
Figure 5:
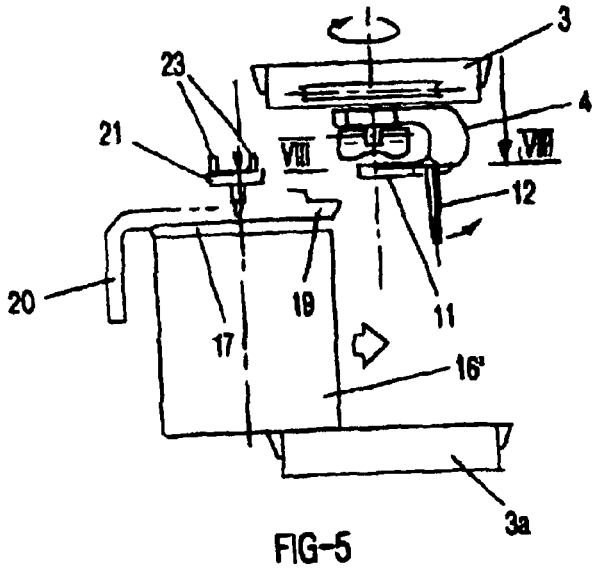
Figure 6:
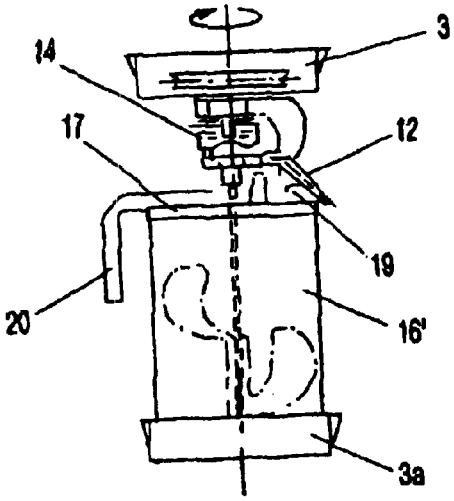

As shown in the drawings, in particular in FIGS. 3–9, the cans 16 provided with their cover 17 are placed on one of the shelves 3, for example the shelf 3a, and are progressively pushed as shown in FIGS. 5 and 6 in order that the centering ring 21 will enter inside the grip 11.

When a can 16 is positioned, the rotation of the small blade 14, driven by the shaft 7, causes the small blade 14 to necessarily bear by its two ends against both of the protruding fingers 23, which results in driving the plate 22 and, consequently, the shaft 18 of the respective can. The concavity 14a of the small blade 14 prevents any risk of wedging by staying with the fingers 23. Moreover, the presence of the cams or ramps 24 that are sloped in the direction of rotation of the plate 22 aids to the raising of the small blade 14 that continuously rotates.

FIG. 5 shows that before engagement of the centering ring 21 in the grip 11, the stirrup 12 is substantially maintained vertically. Advancing the can 16 which slides on the shelf 3a causes the stirrup 12 to pivot as shown in FIG. 6. *As shown in FIGS. 4 and 5, the region between the stirring head 4 and the shelf 3a where the can is to be inserted is free of*

Figure 7:
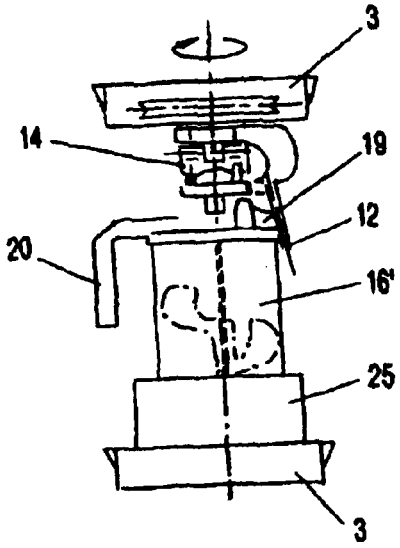
Figure 8:
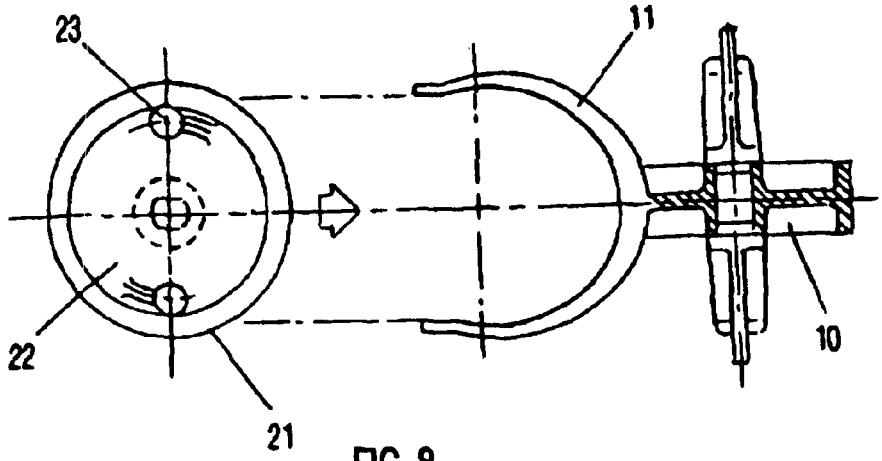
FIG. 8 is a very enlarged cross-section taken along line VIII—VIII of FIG. 5.
Figure 9:
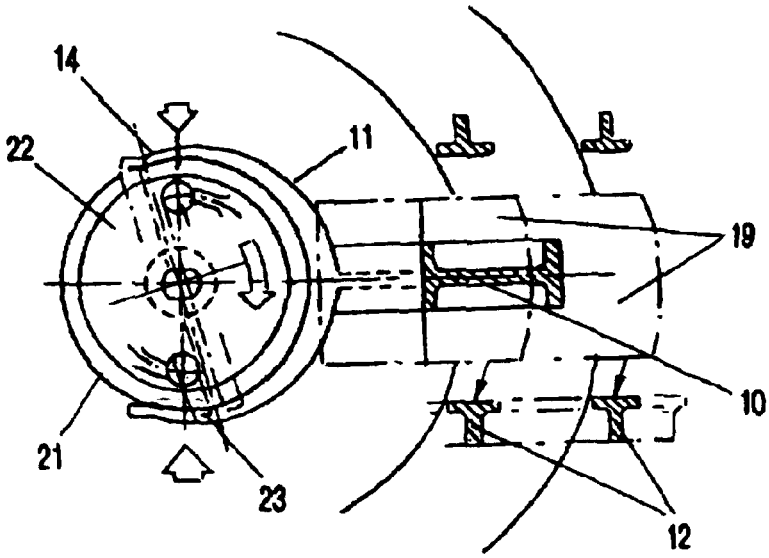
FIG. 9 is a cross-section similar to FIG. 8 but showing a stirrer can engaged with the driving head.

*obstructions that would restrain insertion of the can or the cover to a single orientation about its axis.* As soon as the plate 22 (*FIG. 3*) is driven in rotation by the small blade 14 and fingers 23, the can 16, *because its angular orientation is not fixed,* is possibly rotated a little bit, but in any case, one attachment 19, for example the pouring nose, will limit the possible rotation of the can, of which only the shaft 18 continues to be driven, which is shown in FIGS. 6 and 7, *FIG. 7 showing the can in its final resting orientation.*

FIG. 7 shows moreover that the invention enables to cause cans, having various heights, to be driven by any one of the stirring heads 4. It is then sufficient to position a raising member 25 on the shelf 3a.

Figure 10:
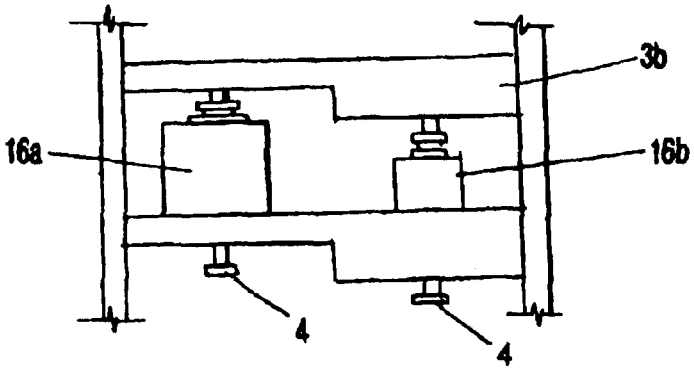
FIG. 10 is a diagrammatic partial cross-section showing a development of a cabinet that applies the invention.

FIG. 10 illustrates a development showing that the bottom portion of a shelf 3b may comprise two stirring heads 4 arranged at various levels, these offset stirring heads enabling to drive the stirring shafts of cans 16a, 16b of various heights, preferably positioned one behind the other or staggered one relative to the other for facilitating access to a rear row.

Figure 11:
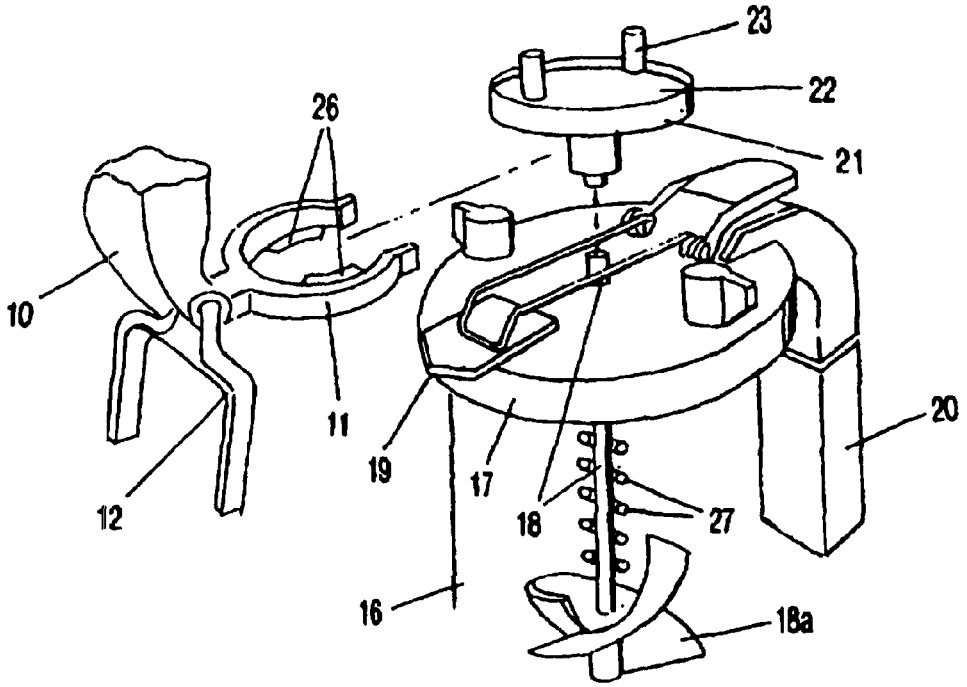
FIG. 11 is an exploded perspective view illustrating a development of the invention.

FIG. 11 shows a development of the invention according to which the grip 11 is insidely provided, at its lower portion, with lugs or other supporting means 26 that protrude inwardly. The means 26 are adapted for bearing against the bottom portion of a protruding portion of the cover 17 or, as shown, against the bottom portion of the centering ring 21. The cover 17 covering the can 16 is positioned in the grip 11 as described above.

In this embodiment, a unit formed by the can, the cover and the driving mechanism is thus suspended by the grip 11 without the can 16 being supported on a shelf 3. As previously, the can 16 is prevented from rotating by means of the stirrup 12, and the shelves 3 can be manufactured for having a top portion which is smooth and easily cleanable.

For preventing an axial displacement of the shaft 18 that drives the stirring screw 18a, it is advantageous to position a spring 27 engaged on the shaft 18 and bearing, on the one hand, on the bottom portion of the cover 17 and, on the other hand, on the stirring screw 18a. The strength of the spring 27 is chosen according to the weight of the can 16 and the product contained therein.

Figure 12:
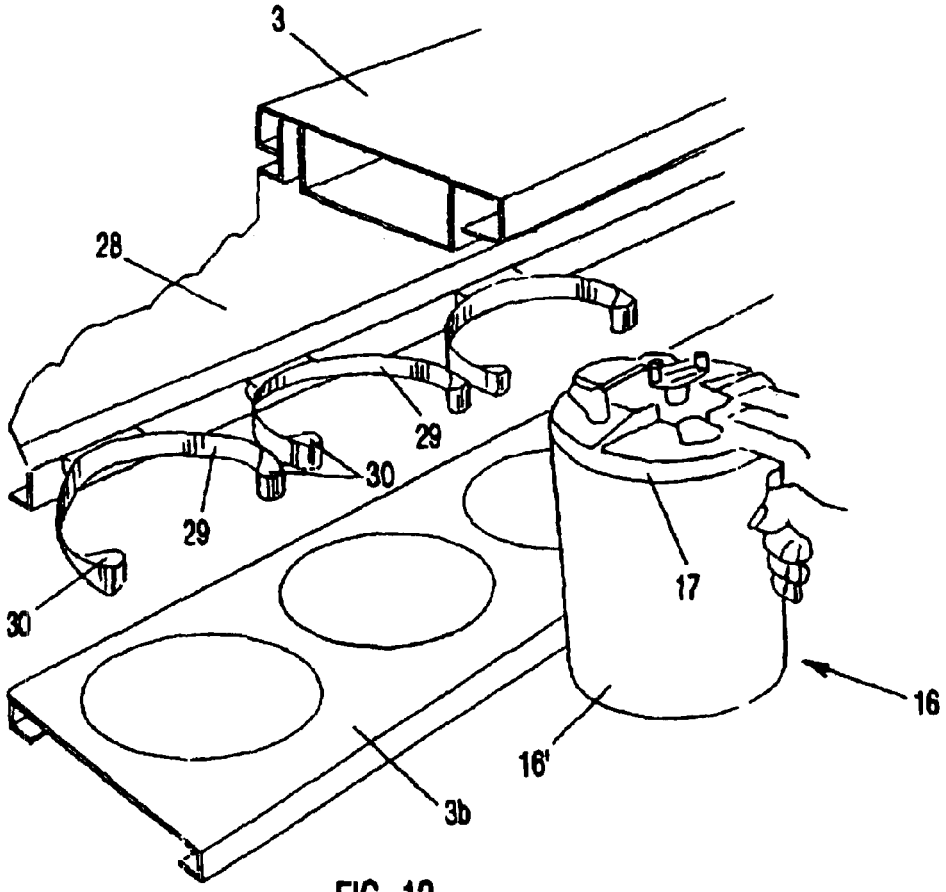
FIG. 12 is a partial exploded perspective view illustrating the development of the invention according to FIG. 11 in an other embodiment.

FIG. 12 illustrates an other variant which shows that the bottom portion of the shelves 3 defines a bent edge 28 for grip supports 29, each provided to clamp a can 16 by bearing against the bottom portion of the cover 17.

It is advantageous that the grip supports 29 which are made of a resilient material will be covered with an elastomeric material or the like so to form, on the one hand, a protection and, on the other hand, end protrusions 30 for retaining the can 16. The grip supports 29 are arcuate and have an angular opening greater than 180°.

It is moreover possible that the centering ring 21 is attached to the plate 22 and, in case, will be spaced therefrom by a ball bearing or the like in order that there is no friction between the plate 22 and the grip 11.

The invention is not restricted to the embodiments shown and described in detail, since various modification thereof can be carried thereto without departing from the scope of the invention as shown in the following claims.

What I claim is:

1. A driving head for a stirrer can, the stirrer can comprising a cover with a rotatable plate having upwardly projecting fingers and further comprising a stirrer inside the stirrer can, said driving head mounted beneath a hollow shelf and comprising:

a driven shaft;

a blade fixedly connected to said driven shaft;

said blade engaging the fingers for driving the stirrer inside the stirrer can;

a swan-neck shaped body having an upper portion connected to the shelf and a lower portion;

said lower portion of said body comprising a grip for engaging the rotatable plate of the stirrer can;

said driven shaft projecting through said upper portion of said body; and means for preventing rotation of the stirrer can by engaging a portion of the cover of the stirrer can after placement of the stirrer can on a shelf below the hollow shelf to which said body is connected.

2. A driving head according to claim 1, further comprising anti-friction means positioned between said grip and the rotatable plate.

3. A driving head according to claim 1, wherein said body comprises a protecting hub of a substantially circular shape positioned closely above said blade.

4. A driving head according to claim 3, further comprising a drive pulley connected to said driven shaft, said drive pulley positioned within the hollow shelf, wherein said hub comprises a sleeve and a bearing member mounted in said sleeve and wherein said driven shaft is guided in said bearing member.

5. A driving head according to claim 3, further comprising a spindle connected to an end of said shaft below said hub, said blade pivotably connected to said spindle, said blade having a bottom portion with a concave cutout to prevent wedging the fingers of an operator.

6. A driving head according to claim 1, wherein said means for preventing rotation of the stirrer can is a pivotable stirrup connected to said body.

7. A driving head according to claim 6, wherein said body comprises a bearing member and wherein said stirrup is connected to said bearing member, said stirrup comprising a yoke with studs for connecting said stirrup to said bearing member.

8. A driving head according to claim 1, wherein said grip has means for supporting the cover and the stirrer can.

9. A driving head according to claims 8, wherein said grip has a U-shape with two legs, wherein said means for supporting are lugs connected to the bottom side of said grip at said two legs, wherein said lugs project from said two legs inwardly into said U-shape.

10. A driving head according to claim 1, wherein the cover has a bottom portion and wherein the hollow shelf has a grip support for engaging the bottom portion of the cover.

11. A stirrer can for cooperation with a driving head mounted beneath a shelf, said stirrer can comprising:

a can container;

a cover for closing said can container;

a rotatable plate mounted on said cover;

said rotatable plate having upwardly projecting fingers;

a stirrer connected to said rotatable plate and positioned inside said can container;

said fingers engaged by the driving head when said stirrer can is positioned on a shelf beneath the hollow shelf on which the stirrer head is mounted;

a spring with a first and a second end;

said stirrer comprising a shaft and a stirring screw at an end of said shaft remote from said cover;

said spring coaxially placed on said shaft and supported with said first end at a bottom side of said cover and with said second end at a said stirring screw.

12. A cabinet for stirrer cans, said cabinet comprising:

a plurality of hollow shelves spaced one atop the other;

each hollow shelf having a smooth surface;

each hollow shelf having connected thereto a plurality of driving heads;

each one of said driving heads comprised of:

a) a driven shaft and a blade fixedly connected to said driven shaft, said blade engaging a stirrer of a stirrer can for driving the stirrer inside the stirrer can;

b) a swan-neck shaped body having an upper portion connected to said hollow shelf and a lower portion;

c) said lower portion of said body comprising a grip for engaging a rotatable plate of the stirrer can;

d) said driven shaft projecting through said upper portion of said body;

e) a drive pulley connected to said driven shaft and positioned inside said hollow shelf; and f) means for preventing rotation of the stirrer can by engaging a portion of a cover of the stirrer can after placement of the stirrer can on a shelf below said hollow shelf to which said body is connected;

a drive means for driving at least one of said drive pulleys.

13. A cabinet according to claim 12, wherein at least one of said hollow shelves has a bottom portion with two levels, such that said driving heads connected to said bottom portion are at different levels.

14. A cabinet according to claim 12, wherein said shelves comprise raising members for raising the stirrer cans to a desired level.

*15. A system for stirring paint in an insertable can, comprising:*

*a can cover with a rotatable paint stirrer;*

*a can support shelf;*

*a stirring head positioned above the shelf that engages the stirrer when the can is inserted on the shelf, and*

*an interference arm extending from above the location of the can downwardly toward the shelf that mechanically interferes with the cover as a stop against rotation in a single direction to prevent rotation of the cover in the same direction of rotation of the stirrer,*

*a region between the stirring head and the shelf for inserting a can for stirring, the region being free of obstructions that would restrain insertion of the can or the cover to a single orientation on the shelf,*

*wherein the interference arm is pivotable with respect to the stirring head.*

*16. A system for stirring paint in an insertable can, comprising:*

*a can cover with a rotatable paint stirrer;*

*a can support shelf;*

*a stirring head positioned above the shelf that engages the stirrer when the can is inserted on the shelf, and*

*an interference arm extending from above the location of the can downwardly toward the shelf that mechanically interferes with the cover as a stop against rotation in a single direction to prevent rotation of the cover in the same direction of rotation of the stirrer,*

*a region between the stirring head and the shelf for inserting a can for stirring, the region being free of obstructions that would restrain insertion of the can or the cover to a single orientation on the shelf,*

*wherein the can cover includes a pouring spout and the interference arm engages the spout to prevent rotation,*

*wherein the paint stirrer includes a rotatable drive shaft, and further including an engaging member connected to the stirring head, the engaging member engaging an upper portion of the drive shaft, and*

*wherein the engaging member is a collar.*

*17. The system of claim 16 wherein the collar is a resilient member.*

*18. A system for stirring paint in an insertable can, comprising:*

*a can cover with a rotatable paint stirrer;*

*a can support shelf;*

*a stirring head positioned above the shelf that engages the stirrer when the can is inserted on the shelf, and*

*an interference arm extending from above the location of the can downwardly toward the shelf that mechanically interferes with the cover as a stop against rotation in a single direction to present rotation of the cover in the same direction of rotation of the stirrer,*

*a region between the stirring head and the shelf for inserting a can for stirring, the region being free of obstructions that would restrain insertion of the can or the cover to a single orientation on the shelf,*

*wherein the can cover includes a pouring spout and the interference arm engages the spout to prevent rotation,*

*wherein the paint stirrer includes a rotatable drive shaft, and further including an engaging member connected to the stirring head, the engaging member engaging an upper portion of the drive shaft*

*wherein the engaging member is connected to a downwardly extending body, and*

*wherein the interference arm is connected to the body adjacent the engaging member.*

*19. The system of claim 18 wherein the upper shaft portion includes upwardly extending fingers and the head includes a stirrer driver having a blade articulatable with the fingers to effect rotation.*

*20. The system of claim 19 wherein the upper shaft portion includes a plate and the engaging member engages the plate.*

*21. A system for stirring paint in a plurality of removable paint cans, comprising:*

*a plurality of removable can covers for respective cans, each cover having a paint stirrer for the respective can that includes a rotatable drive shaft;*

*a can support shelf for a row of removable cans; and*

*a plurality of individual stirring heads, one for each can in the row, each individual stirring head being portioned above the shelf so as to engage the stirrer in the cover when the can is inserted with its cover on the shelf, each stirring head comprising a body carrying a rotational stirrer drive mechanism, a portion of said body being shaped to trap the cover in position when the can is inserted on the shelf so that the drive shaft of the stirrer in the cover is drivingly aligned with the rotational drive mechanism in the stirring head, said body further including an interference arm, separate from said portion of said body, that extends downwardly toward the shelf below said portion of said body and that prevents rotation of the cover as the stirrer rotates by mechanically interfering with the cover as a stop against rotation in a single direction to prevent rotation of the cover in the same direction of rotation of the stirrer and an engaging member for engaging a portion of the drive shaft extending above the can cover,*

*a region between each individual stirring head and the shelf for inserting a respective can for stirring, the region being free of obstructions that would restrain insertion of the respective can or its cover to a single orientation on the shelf.*

*22. The system of claim 21 wherein the stirring head comprises a molded body.*

*23. The system of claim 22 wherein the body is plastic.*

*24. The system of claim 23 wherein the shaft portion includes a plate with upwardly extending fingers and the stirring head including a driver with a blade actuatable with the fingers to effect rotation, and the engaging portion engages the plate.*

*25. The system of claim 22 or 24 wherein the interference arm is a single downwardly extending arm.*

*26. The system of claim 22 or 24 wherein the interference arm comprises two downwardly extending arms.*

*27. The system of claim 22 or 24 wherein the interference arm is pivotable with respect to the stirring head.*

*28. The system of any one of claims 22 or 24 wherein the can cover includes a pouring spout and the interference arm engages the spout to prevent rotation.*

*29. The system of claim 22 or 24 wherein the shelf is free of pins.*

*30. The system of claim 21 wherein the head is connected to a hollow shelf arranged above the can cover.*

* * * * *